Jan. 9, 1951          E. C. HORTON          2,537,271

MOTOR VEHICLE ACCESSORY SYSTEM

Filed April 16, 1949          3 Sheets-Sheet 1

INVENTOR.

Erwin C. Horton

BY Bean, Brooks, Buckley & Bean

ATTORNEYS.

Jan. 9, 1951  E. C. HORTON  2,537,271
MOTOR VEHICLE ACCESSORY SYSTEM
Filed April 16, 1949  3 Sheets-Sheet 2

INVENTOR.
Erwin C. Horton
BY Bean, Brooks, Buckley & Bean
ATTORNEYS.

Jan. 9, 1951 E. C. HORTON 2,537,271
MOTOR VEHICLE ACCESSORY SYSTEM
Filed April 16, 1949 3 Sheets-Sheet 3
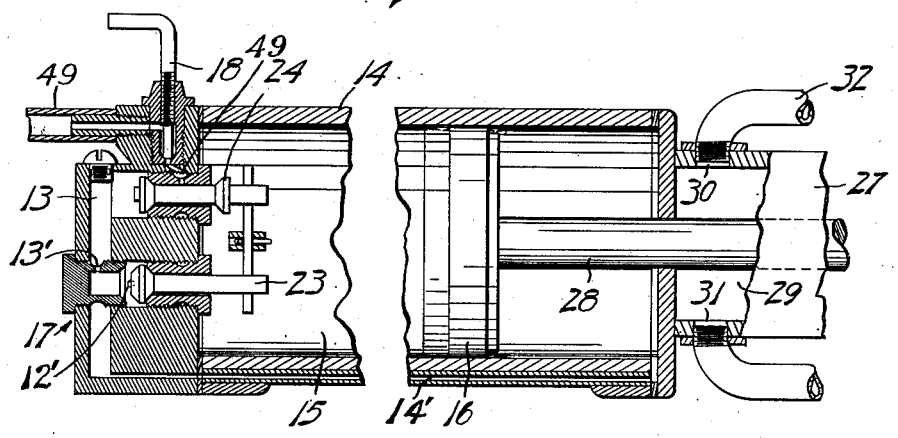
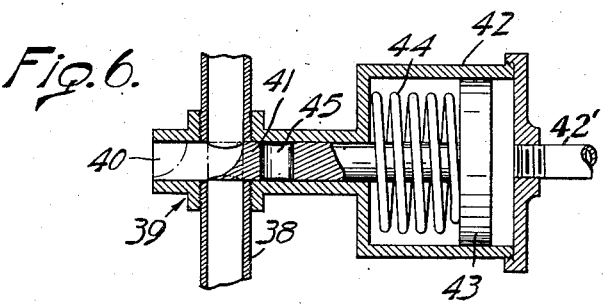
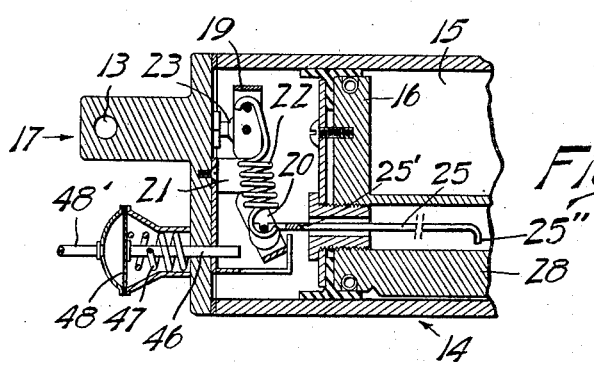
INVENTOR.
Erwin C. Horton
BY Bean, Brooks, Buckley & Bean
ATTORNEYS.

Patented Jan. 9, 1951

2,537,271

UNITED STATES PATENT OFFICE 2,537,271

MOTOR VEHICLE ACCESSORY SYSTEM

Erwin C. Horton, Hamburg, N. Y., assignor to Trico Products Corporation, Buffalo, N. Y.

Application April 16, 1949, Serial No. 88,009

9 Claims. (Cl. 60—52)

This invention relates to an automotive accessory system and has particular reference to the operation of accessories hydraulically.

It has heretofore been proposed to operate accessories off of the engine lubricating system, but this has necessitated taking the engine lubricating oil up through the accessory with possible detrimental effect on the lubricating system.

The primary object of the present invention is to provide a hydraulic accessory system which is more practical in that the engine lubricating system is kept removed from the accessory.

A further object of the invention is to provide an accessory system in which the accessory itself is contained within a closed liquid circulating system separate and independent from the engine lubricating system.

The foregoing and other objects will manifest themselves as the following description progresses, reference being had to the accompanying drawing, wherein Fig. 1 is a general lay out of the improved accessory system;

Figs. 4 and 5 are fragmentary sectional views through the oil motor; and

Fig. 6 is a detailed sectional view through the pressure responsive air valve of the accessory circuit.

Figure 1:
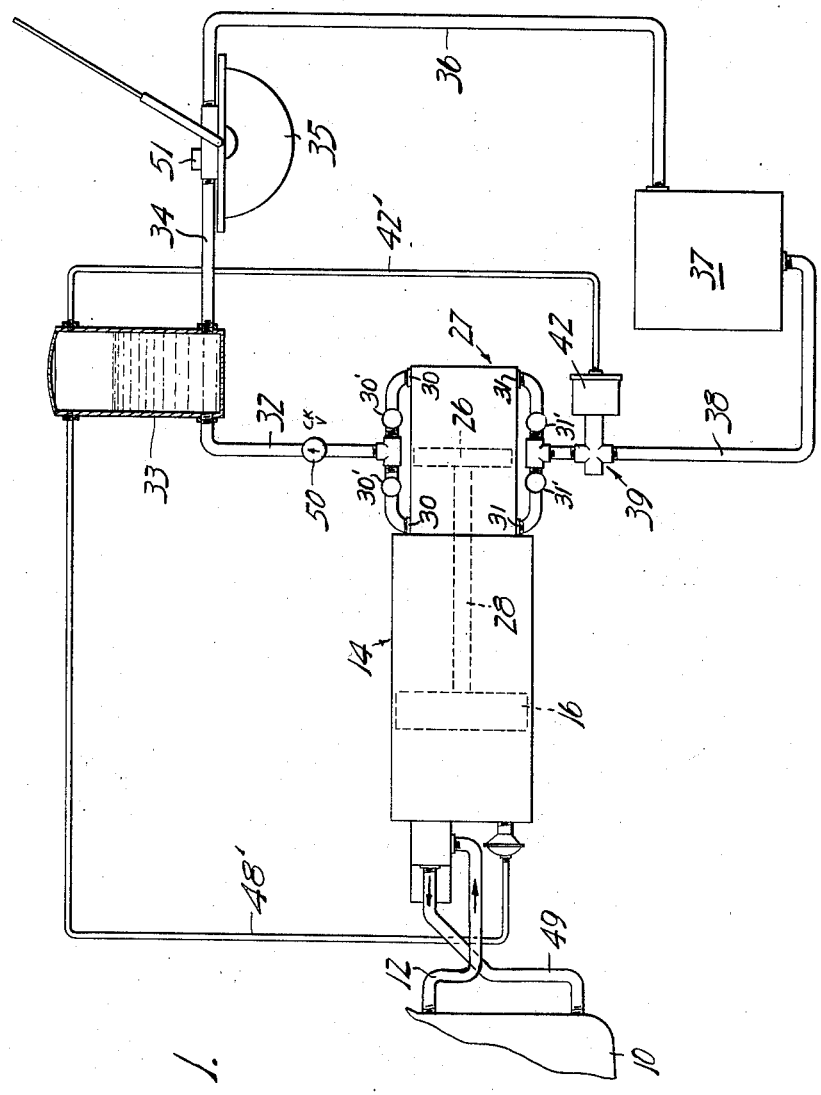
Figure 2:
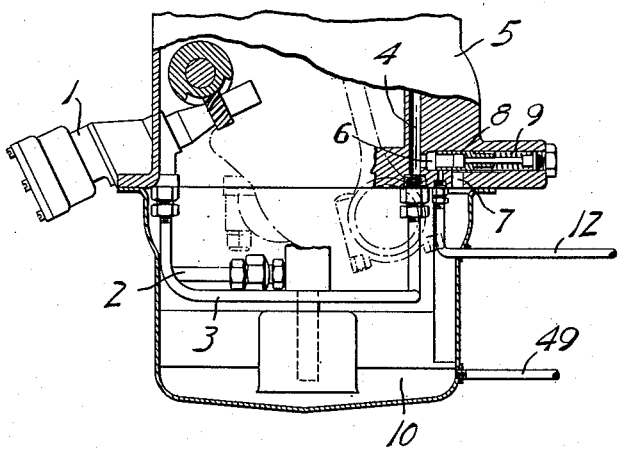
Fig. 2 is a fragmentary sectional view of the engine through its crank case.
Figure 3:
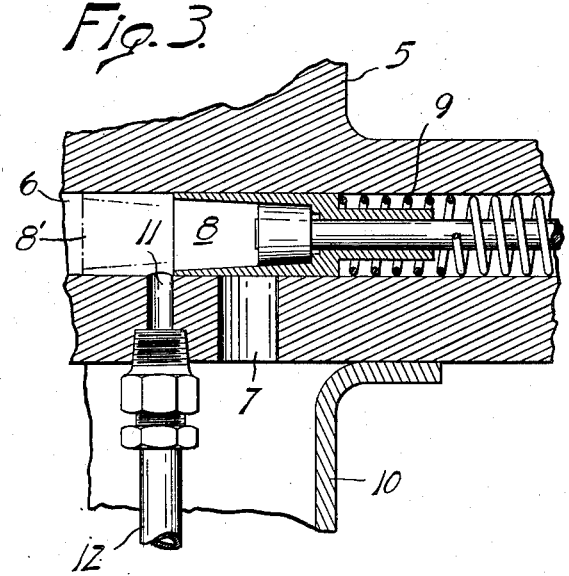
Fig. 3 is an enlarged detailed sectional view of the engine by-pass valve.

Referring more particularly to the drawing, the numeral 1 designates the oil pump having an inlet pipe 2 and an outlet or discharge pipe 3 which is connected with the oil duct 4 extending up through the engine block 5. Branching off from this duct is a by-pass 6 with a return port 7 that is normaly closed by a valve 8 under the urge of a spring 9. Normally the valve is held in its forward position indicated by the broken line 8', and when the lubricating system pressure exceeds a predetermined degree and in excess to that required to effectively lubricate the engine and its moving parts, the by-pass valve 8 will recede to a port opening position so that the excess fluid will find its way back through the port 7 into the crank case 10.

In accordance with the present invention, an excess pressure take-off port 11 is provided and located in a position to be normally closed by the by-pass valve 8, and this take-off port 11 is connected by a conduit 12 to a valve chamber 13 of an oil motor 14. In practice the take-off port will be located closer to the port 7. It may be disposed on the opposite side of the by-pass 6 even to overlap the port 7. This motor has a chamber 15 and a piston 16 to the opposite sides of which latter the oil pressure is intermittently applied by a valve mechanism 17 when the control valve 18 is opened, the automatic valve mechanism incorporating a snap action which comprises a pair of opposed yokes 19 and 20 pivotally mounted on a bracket 21 and resiliently connected by a spring 22 for snapping the valves 23 and 24 back and forth between two operative positions as the piston 16 is reciprocated. A link 25 is connected by a play connection to the piston for movement by the latter back and forth across a dead center position. This valve action is more clearly shown in the patent of W. M. Folberth, Reissue No. 15,502 of December 5, 1922.

The motor piston 16 is mechanically connected to a piston 26 of a pump 27, as by a piston rod 28, the piston 26 moving back and forth within a chamber 29, which latter has a pair of outlet ports 30 in its opposite ends and a pair of inlet ports 31 likewise disposed, suitable check valves 30' and 31' serving to direct the flow of fluid, and the outlet ports being connected by a conduit 32 to a storage receiver or reservoir 33. The receiver, in turn, is connected by a conduit 34 to the accessory 35, and from the latter the hydraulic fluid is returned through a conduit 36 to a sump 37 from which the fluid is withdrawn through the conduit 38 and said inlet ports 31. This completes the hydraulic cycle for the one or more accessories, which cycle is separate and independent from the engine lubricating system and therefore offers no hazard for the efficient performance of the latter. The reservoir 33 will have a sealed off air chamber in which the air pressure will build up as the incoming liquid crowds it into a less confined space. The air pressure will be determined so as to impress a desired pressure on the liquid in the circuit. Should the air pressure be deficient, additional air may be pumped therein through an air valve 39 interposed in the inlet conduit 38. This valve has an atmospheric port 40 and a valving member 41 designed to connect the inlet port into the otherwise closed circuit to connect the inlet port into the otherwise closed circuit when desired. The air valve is responsive to the pressure in the reservoir, and to this end is connected by a conduit 42' to an air motor 42 which has a piston 43 mechanically connected to the valving member and yielding against a spring 44 as the reservoir pressure builds up. When the desired pressure has been reached, the air inlet port 40 will be closed and the passage 45 in the valving member will reopen the conduit 38 between the sump and the pump 27.

When the accessory is not in use and the air pressure in the reservoir is ample, means are provided to render the motor 14 inoperative, such means being connected to the reservoir by a conduit 48' for responding to the reservoir pressure. As shown in Fig. 5 the illustrated embodiment comprises an arresting stop 46 normally held inoperative by a spring 47 and mechanically connected to a pressure movable wall 48 for being projected into the path of a yoke 20 to prevent the valve snap action from operating. The arrangement is such that when the motor 14 is inoperative the engine lubricant will not circulate. This interference with the tripping of the automatic valve in the oil motor is designed to arrest the valve in the position wherein the oil pressure will be opened to the right hand end, Fig. 4.

When the accessory 35 is again brought into action, resulting in a lowering of the pressure on the arresting stop 46 to enable retraction of the latter by its spring 47, the valve action 19, 20 will snap the valves 23, 24 to their other limit positions from that shown in Fig. 4 and reverse the pressure application to the left end of the piston. The link 25 is provided with spaced shoulders 25' and 25" which are alternately engaged by the piston as it moves back and forth to so reverse the application of pressure.

The path of fluid flow through the automatic valve mechanism is from the admission port 12', Fig. 4, either through the clearance about the valve stem and into the nearside of the motor chamber 15, or through a port 13' into the valve chamber 13 and by passage 14' into the far side of the chamber. While the pressure fluid is entering the motor chamber 15 the spent oil is exhausting through the clearance about the stem of valve 24 and port 49' back to the crankcase.

A check valve 50 may be provided in the outlet pipe 32 for holding the pressure in the reservoir. A shut-off control valve 51 may be provided for regulating the accessory.

The accessory system is practical and efficient in operation. The storage capacity of the receiver is materially increased by reason of the injected air. The air valve 39 may be adjusted to function at the desired pressure. In lieu of the slide valving member 41, a snap action arrangement may be provided, such as shown in Fig. 5, so as to positively and definitely close off one port while opening the other. In operation the air or vent port 40 will remain closed and the system will function as a straight hydraulic system, but there would be a precharged receiver with a greater air capacity than might be obtained without the assistance of the pump.

Furthermore, the air reservoir or receiver will serve to operate the accessory during brief intervals when the engine is idling, at which time the pressure on the lubricating system may be insufficient in itself to open the by-pass 6, 7.

The foregoing description has been given in detail for clarity, and not by way of limitation, since the inventive principles involved are capable of assuming other physical embodiments without departing from the spirit of the invention and the scope of the appended claims.

What is claimed is:

1. A motor vehicle having a power plant with a lubricating system, an accessory system including a pump and an accessory connected in a closed hydraulic circuit, and an oil operated motor connected in circuit with the lubricating system and operatively related to the pump to actuate the same for energizing the closed hydraulic circuit.

2. A motor vehicle having a power plant with a lubricating system, an accessory system including a pump and an accessory connected in a closed hydraulic circuit, an oil operated motor connected in circuit with the lubricating system and operatively related to the pump to actuate the same for energizing the closed hydraulic circuit, and means responsive to the lubricating system pressure for interrupting the circuit connection between the lubricating system and the oil operated motor when the system pressure is below a predetermined degree whereby to insure the proper functioning of the lubricating system in the power plant.

3. A motor vehicle having a power plant with a lubricating system, an accessory system including a pump and an accessory connected in a closed hydraulic circuit, an oil operated motor connected in circuit with the lubricating system and operatively related to the pump to actuate the same for energizing the closed hydraulic circuit, and an oil reservoir interposed in the closed circuit between the pump and the accessory and provided with a trapped air space for the build-up of air pressure therein as the reservoir fills with liquid more or less.

4. A motor vehicle having a power plant with a lubricating system, an accessory system including a pump and an accessory connected in a closed hydraulic circuit, an oil operated motor connected in circuit with the lubricating system and operatively related to the pump to actuate the same for energizing the closed hydraulic circuit, a liquid reservoir interposed in the closed circuit between the pump and the accessory for trapping air pressure to a predetermined degree for impressing the liquid in the closed circuit accordingly, and a pressure responsive valve responsive to the trapped air pressure and arranged at the inlet side of the pump for admitting air to the pump in replenishing the air content of the reservoir.

5. A motor vehicle having a power plant with a lubricating system, an accessory system including a pump and an accessory connected in a closed hydraulic circuit, an oil operated motor connected in circuit with the lubricating system and operatively related to the pump to actuate the same for energizing the closed hydraulic circuit, a liquid reservoir interposed in the closed circuit between the pump and the accessory for trapping air pressure to a predetermined degree for subjecting the liquid in the closed circuit to such trapped air pressure, and a valve arranged at the inlet side of the pump and responsive to the trapped air pressure for opening the inlet side of the pump to the atmosphere and concurrently interrupting the hydraulic connection whereby the pump will replenish the air content in the reservoir to the exclusion of flowing liquid thereinto.

6. A motor vehicle having a power plant with a lubricating system, an accessory system including a pump and an accessory connected in a closed hydraulic circuit, an oil operated motor connected in circuit with the lubricating system and operatively related to the pump to actuate the same for energizing the closed hydraulic circuit, said oil operated motor including an automatic snap action movable back and forth between two operative positions, a liquid reservoir interposed in the closed circuit between the pump and the accessory for building up an operating air pressure in a confined space therein in accordance with the liquid content volume, and means responsive to the pressure of the air in such confined space for arresting the valve action of the oil operated motor.

7. A motor vehicle having a power plant with a lubricating system, an accessory system including a pump and an accessory connected in a closed hydraulic circuit, an oil operated motor connected in circuit with the lubricating system and operatively related to the pump to actuate the same for energizing the closed hydraulic circuit, said oil operated motor including an automatic snap action movable back and forth between two operative positions, a liquid reservoir interposed in the closed circuit between the pump and the accessory for building up an operating air pressure in a confined space therein in accordance with the liquid content volume, means responsive to a minimum predetermined air pressure in the reservoir for admitting a replenishing supply of pressure air thereinto, and means responsive to the pressure of the air in such confined space for arresting the valve action of the oil operated motor.

8. A motor vehicle having a power plant with a lubricating system, an accessory system including a pump and an accessory connected in a closed hydraulic circuit, an oil operated motor connected in circuit with the lubricating system and operatively related to the pump to actuate the same for energizing the closed hydraulic circuit, means normally interrupting the circuit connection between the lubricating system and the air operated motor to preserve the integrity of the lubricating system of the power plant during engine idling operation and responsive to a build-up in the lubricating system pressure for opening the circuit connection to the oil operated motor to energize the accessory system.

9. A motor vehicle having a power plant with a lubricating system, an accessory system including a pump and an accessory connected in a closed hydraulic circuit, an oil operated motor connected in circuit with the lubricating system and operatively related to the pump to actuate the same for energizing the closed hydraulic circuit, and means responsive to the fluid pressure in the closed circuit for rendering the motor inoperative.

ERWIN C. HORTON.

No references cited.